Patented Feb. 19, 1929.

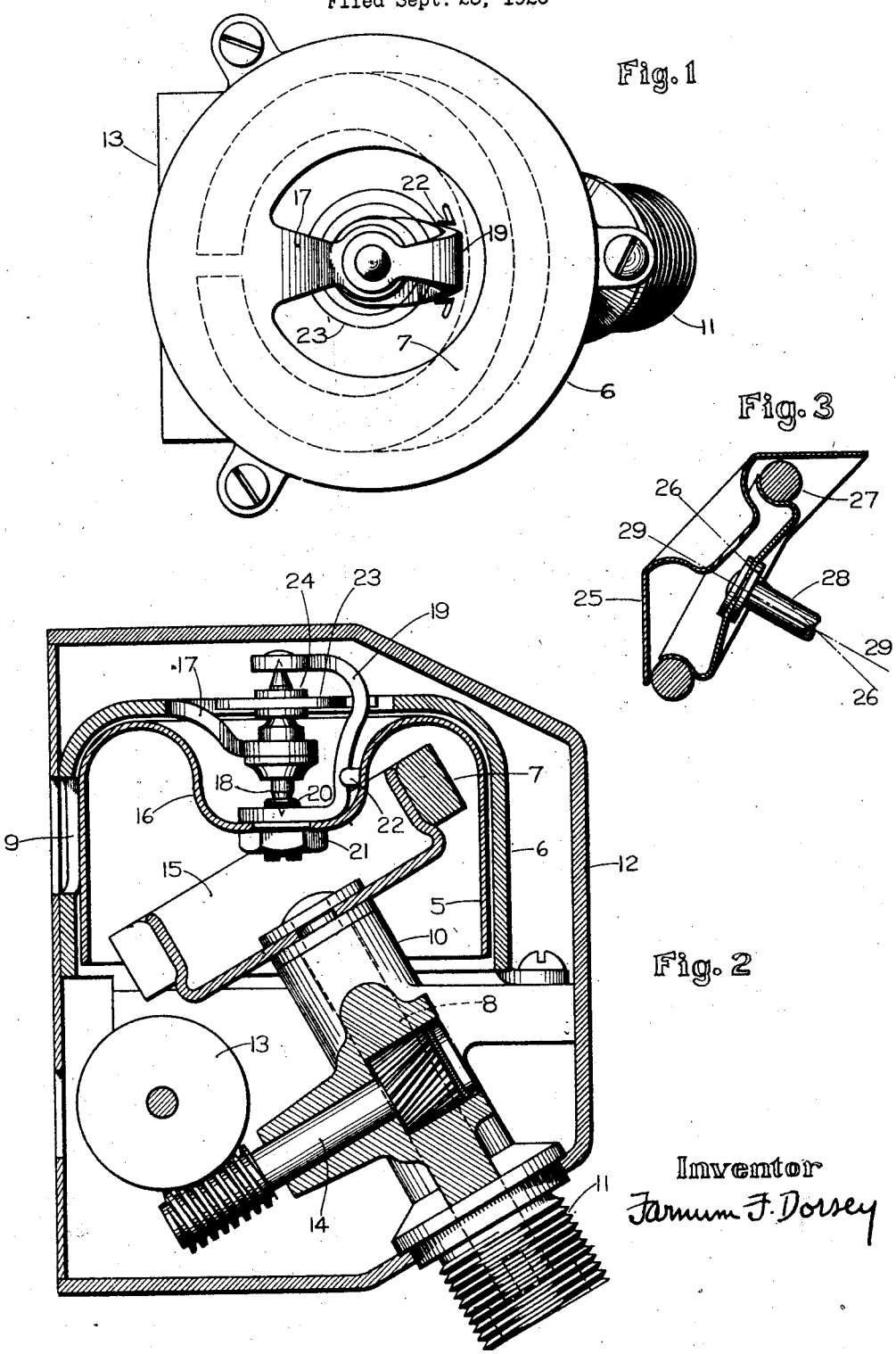

1,702,725

UNITED STATES PATENT OFFICE.

FARNUM F. DORSEY, OF ROCHESTER, NEW YORK, ASSIGNOR TO NORTH EAST ELECTRIC COMPANY, OF ROCHESTER, NEW YORK, A CORPORATION OF NEW YORK.

MAGNETIC SPEEDOMETER.

Application filed September 28, 1926. Serial No. 138,314.

This invention relates to speed measuring instruments of the magnetic type, in which a revolving magnetic field is caused to rotate a spring-controlled indicator by means of the inductive effect of the field.

In instruments of the type in question, as used on motor vehicles, it is usual to drive the revolving magnet or other part by means of a flexible shaft connected with the mechanism of the vehicle, and owing to the position of the instrument upon the upright or slightly inclined instrument board, it is most convenient to have the flexible shaft enter the casing of the instrument from the rear, at a considerable inclination from the vertical. It is also desirable to use an indicator in the form of a more or less cup-like shell or drum, with numerals upon its periphery, visible through an opening in the front of the instrument. This form of the indicator makes it necessary that it shall be mounted upon an axis which is either vertical or only moderately inclined from the vertical.

One purpose of the present invention is to provide a speedometer in which the foregoing requirements are fulfilled, but without the necessity of using gears or flexible driving connections to permit the parts to have the position above described. I have discovered that this may be accomplished by revolving the magnet upon an axis inclined at a substantial angle to the pivotal axis upon which the indicator is mounted. While this results in a magnetic field which revolves in a plane which is not normal to the pivotal axis of the indicator, the parts may be so proportioned and relatively located that this field produces a sufficiently steady and powerful torque upon the indicator to produce the required movement.

In instruments of the type in question, it has been customary to use an indicator consisting of thin sheet aluminum or other conductive material of light weight, and to provide this indicator with an integral supporting arm which is fixed, at its inner end, to the pivot-staff by which the indicator is rotatively supported. In this construction difficulty has been encountered in providing a supporting arm of sufficient rigidity, and a second object of the present invention is to improve the construction of the instrument with respect to the manner in which pivotal support is provided for the indicator. To this end, I attach the pivot-staff to a stationary arm, which may be formed of material as heavy and rigid as is necessary for the purpose, while the bearings which engage the ends of the pivot-staff are attached to the indicator and may be formed of material harder and more rigid than that which, for electrical reasons, is used in the indicator itself.

In the accompanying drawings, Fig. 1 is a plan-view of the interior parts of a speedometer embodying the present invention. Fig. 2 is a side elevation, partly in section, of the instrument of Fig. 1, together with the casing within which it is enclosed; and Fig. 3 is a partial sectional view of a modified form of construction.

The invention is illustrated, in Figs. 1 and 2, as embodied in a speedometer having an indicator 5 in form of a generally cylindrical shell drawn from thin sheet metal such as aluminum. In these two figures the parts are shown as about twice the actual size. The indicator is surrounded by a stationary magnetic mass or inductor 6, formed from sheet steel drawn to generally cylindrical form. The indicator is arranged to turn about a vertical axis.

The magnet 7, by which the revolving field is produced, has the usual form of a divided ring, and it is fixed on the upper end of a drive-shaft 8. The inductor 6 is provided with a window 9 at the front, through which graduations on the outer surface of the indicator will be visible. The shaft 8 is journalled in a frame 10 having, at the bottom, a threaded projection 11 which extends outwardly through an opening in the casing 12 of the instrument. The flexible shaft by which the drive-shaft 8 is actuated may be enclosed in a flexible housing attached to the projection 11 in the usual manner. The usual odometer 13 may also be enclosed in the casing 12 and driven from the shaft 8 by suitable connections, such as a worm shaft 14. The magnet 7 is shown as mounted upon a shell 15, of brass or other non-magentic material, fixed to the upper end of the drive-shaft 8.

As shown in Figs. 1 and 2, the drive-shaft is inclined at an angle of 30° from the vertical, while the indicator is pivoted to turn upon a vertical axis. The magnet thus produces a rotary field in a plane inclined at 30° to the horizontal. This field, particularly near the ends of the magnet, passes through the cylindrical body of the indicator from one pole of the magnet, to the stationary inductor 6 and thence back again, through the indicator, to the other pole of the magnet, in the usual manner. The tendency of the field is to rotate the indicator about an axis coincident with that of the magnet. Such rotation is prevented by the pivotal support of the indicator, but the rotative effect of the field has a principal component tending to rotate the indicator about its pivoted axis, so that the effect of the field upon the indicator is sufficient for practical results, though somewhat less than if the magnet were coaxial with the indicator. This arrangement therefore permits the flexible shaft to enter the instrument at a substantial angle to the pivotal axis of the indicator, but without the necessity of interposing angle gears or any equivalent mechanical means between the drive-shaft and the magnet.

In order to provide clearance, at the rear, between the magnet and the top of the indicator, the latter must be made somewhat deeper than in an instrument of ordinary construction. The middle portion 16 of the indicator is pressed downwardly, however, for the purpose both of stiffening the indicator and to provide ample space for the pivotal means by which it is supported. The inductor 6 has an opening at the top, and an integral arm 17 projecting to the middle of the opening. The pivot-staff 18 is fixed to the inner end of the arm 17, and is pointed at both ends. The bearing which cooperates with the upper end of the staff is provided by an arm 19 having a suitable bearing-recess in its upper end, and the lower end of the arm 19 is fixed to the depressed middle part 16 of the indicator. For this purpose a screw 20 is used, the screw being threaded into the arm while a nut 21 is screwed against the bottom of the indicator, thus drawing the arm tightly in place. The lower pivotal bearing is provided by a suitable recess in the screw 20, and this screw also provides means for adjusting the play in the pivot bearings, as it can be raised or lowered as necessary, when the nut 21 is loosened.

To prevent the arm 19 from turning accidentally out of its proper position, two lugs 22 are struck up from the material of the indicator, in position to engage the sides of the arm. The usual hair-spring 23, by which the indicator is controlled and is returned to its normal zero position, is attached at its inner end to a collar 24 on the pivot-staff, the outer end of the spring being attached, in any convenient manner, to the arm 19.

The parts are shown in the portion occupied when the instrument is registering some intermediate speed, but it will be understood that when the instrument is not in use, and the magnet is motionless, the hair-spring will act on the arm 19 to turn the indicator in a counter-clockwise direction, as seen in Fig. 1, until the movement is arrested by engagement of the arm 19 with arm 17 in the zero position of the indicator.

Since the arm 19 is not made of the substance of the indicator 5, it may consist of material as rigid and thick as is found desirable to secure the necessary stiffness, and the manufacture of the instrument is also facilitated, since the indicator may be of relatively simple form, as shown. The construction has the further advantage that the pivot-members and the hair-spring may all be assembled independently of the indicator, and need not be disarranged in case it is necessary to remove the indicator for replacement or repair.

The form and arrangement of parts shown in Figs. 1 and 2 permit conveniently of an inclination of the drive-shaft from the vertical to the extent of about 30°. By the use of an indicator of another form, however, a much greater inclination is rendered practical. It has been previously proposed to use an indicator having the form of a truncated cone, with elements at an angle of 90°, as shown in the indicator 25 in Fig. 3. Such an indicator may be pivoted on an axis 26 inclined at 45° from the vertical, since the lower forward portion of the indicator will still be vertical and therefore conveniently visible through an opening in the front of the instrument. Where such an indicator is used, the magnet 27 may be mounted to rotate about an axis 29 which is still further inclined from the vertical, as shown, so that the drive-shaft 28 may conveniently have an inclination of as little as 30° from the horizontal.

The invention is not limited to the embodiments thereof hereinbefore described, and illustrated in the accompanying drawings, but it may be embodied in various other forms within the spirit of the invention as it is defined in the annexed claims.

The invention claimed is:

1. In a magnetic speedometer, the combination, with a pivotally mounted electrically conductive indicator and a ring-shaped permanent magnet, of means for supporting the magnet in clearance relation with the indicator and for rotating it about an axis intersecting the pivotal axis of the indicator, at a substantial angle therewith.

2. In a magnetic speedometer, the combination, with a pivotally mounted indicator comprising electrically conductive sheet-metal in substantially cylindrical form, of a ring-shaped permanent magnet rotatably mounted within the indicator and with its circular center lying substantially in the pivotal axis of the indicator, and a shaft, upon which the magnet is mounted, journalled on an axis intersecting the pivotal axis of the indicator, at a substantial angle therewith.

3. In a magnetic speedometer, the combination, with an indicator consisting of conductive sheet-metal drawn into cup-like form at its middle portion, of two pivot-bearings arranged coaxially with the indicator and located at a substantial distance apart, with one bearing fixed to the indicator near the bottom of the cup-like part thereof, a rigid yoke-member interconnecting the two bearings, a pivot-staff seated, at its ends, in said bearings, and a rigid stationary arm attached to and supporting the pivot-staff.

4. In a magnetic speedometer, the combination, with an indicator consisting of conductive sheet-metal, of a yoke-member provided with a pivot-bearing at one end and a screw-threaded opening at the other end, a screw engaging said opening and securing the yoke-member to the middle of the indicator, said screw being provided with a pivot-bearing, a pivot-staff engaging said bearings at its ends, and a stationary member having a rigid arm to the end of which the pivot-staff is fixed.

5. In a magnetic speedometer, the combination, with an indicator, of conductive sheet metal, having the form of a concavo-convex surface of revolution and pivotally mounted upon its axis of symmetry, of a shaft journalled on an axis intersecting, at a substantial angle, said axis of symmetry, and a magnet, mounted on and revoluble by said shaft, in a position such that its poles describe a circle adjacent the concave surface of the indicator, which circle is approximately concentric with the perimeter of the section of the indicator in the plane of said circle.

FARNUM F. DORSEY.